United States Patent
Li et al.

(10) Patent No.: US 8,812,782 B2
(45) Date of Patent: Aug. 19, 2014

(54) MEMORY MANAGEMENT SYSTEM AND MEMORY MANAGEMENT METHOD

(75) Inventors: Jian Li, Beijing (CN); Jiin Lai, Taipei (TW); Shan-Na Pang, Beijing (CN); Zhi-Qiang Hui, Beijing (CN); Di Dai, Beijing (CN)

(73) Assignee: VIA Technologies, Inc., Taipei (TW)

( * ) Notice: Subject to any disclaimer, the term of this patent is extended or adjusted under 35 U.S.C. 154(b) by 489 days.

(21) Appl. No.: 12/694,470

(22) Filed: Jan. 27, 2010

(65) Prior Publication Data

US 2011/0066785 A1    Mar. 17, 2011

Related U.S. Application Data

(60) Provisional application No. 61/242,399, filed on Sep. 15, 2009.

(51) Int. Cl.
*G06F 12/00* (2006.01)
*G06F 12/10* (2006.01)

(52) U.S. Cl.
CPC ................... *G06F 12/1036* (2013.01)
USPC .......................... 711/118; 710/107

(58) Field of Classification Search
None
See application file for complete search history.

(56) References Cited

U.S. PATENT DOCUMENTS

| | | | | |
|---|---|---|---|---|
| 4,807,110 A | * | 2/1989 | Pomerene et al. | 711/213 |
| 5,526,508 A | * | 6/1996 | Park et al. | 711/122 |
| 2007/0171916 A1 | * | 7/2007 | Matsutani | 370/395.42 |
| 2007/0276993 A1 | * | 11/2007 | Hiratsuka | 711/112 |
| 2010/0082862 A1 | * | 4/2010 | McGowan | 710/107 |

OTHER PUBLICATIONS

"Translation lookaside buffer" http://en.wikipeadia.org/wiki/Translation_Lookaside_Buffer as archived by www.archive.rog on Aug. 6, 2009.*
"Scratchpad RAM" http://www.webopedia.com/TERM/S/scratchpad_RAM/html as archived by www.archive.org on Dec. 7, 2009.*

* cited by examiner

*Primary Examiner* — Matthew Bradley
*Assistant Examiner* — Daniel Tsui
(74) *Attorney, Agent, or Firm* — Donald E. Stout; Stout, Uxa & Buyan, LLP

(57) ABSTRACT

A memory management system and method include and use a cache buffer (such as a table look-aside buffer, TLB), a memory mapping table, a scratchpad cache, and a memory controller. The cache buffer is configured to store a plurality of data structures. The memory mapping table is configured to store a plurality of addresses of the data structures. The scratchpad cache is configured to store the base address of the data structures. The memory controller is configured to control reading and writing in the cache buffer and the scratchpad cache. The components are operable together under control of the memory controller to facilitate effective searching of the data structures in the memory management system.

17 Claims, 5 Drawing Sheets

| 31 | 21 20 | 17 16 | 15 14 | 13 12 | 5 4 | 0 |
|---|---|---|---|---|---|---|
| R | IACTCNT | IV R | CA CH | R | Slot ID | Device Context Index(DCI) |
| | | | | | | |
| | | | | | | |
| | | | | | | |

FIG. 4A

| 31 29 28 | 16 15 14 | 13 12 | 5 4 | 0 |
|---|---|---|---|---|
| R | Next Link Pointer | ASYNC UPREQ R | Slot ID | Device Context Index(DCI) |

FIG. 4B

| 31 | 16 15 14 | 13 | 5 4 | 0 |
|---|---|---|---|---|
| DB Stream ID | R DBPV REQ | STR ENP | Slot ID | Device Context Index(DCI) |

FIG. 4C

| 31 | 15 | 14 | 13 | 5 | 4 | 0 |
|---|---|---|---|---|---|---|
| R | WB | NOT IN TLB | PIPE RM REQ | Slot ID | Device Context Index (DCI) | |

FIG. 4D

| 31 | 15 | 14 | 13 | 5 | 4 | 0 |
|---|---|---|---|---|---|---|
| R | CA CH | NOT INTLB | PIPE RD REQ | Slot ID | Device Context Index (DCI) | |

FIG. 4E

MEMORY MANAGEMENT SYSTEM AND MEMORY MANAGEMENT METHOD

CROSS-REFERENCE TO RELATED APPLICATIONS

This application claims the benefit of U.S. Provisional Application No. 61/242,399, filed Sep. 15, 2009, the entire contents of which are hereby incorporated by reference.

BACKGROUND OF THE INVENTION

1. Field of the Invention

The present invention generally relates to a memory management system and method thereof, and more particularly to a memory management system and method thereof for efficiently managing data transfer.

2. Description of Related Art

Most present day computer systems implement virtual memory to accelerate the computer systems and reduce the systems' loading. By utilizing virtual memory, the computer systems are able to operate more efficiently in multi-tasking environments, and the computer systems are able to do so at accelerated rates.

However, because of the technology being updated so rapidly, data processed by the computer system tends, tirelessly, to grow larger and larger while becoming more and more complicated. Owing to the size of the data becoming larger and larger and the virtual memory being accessed very frequently, the virtual memory in the computer system often reaches an overloaded state, which reduces the efficiency of the computer system and wastes power. In the Universal Serial Bus (USB) 2.0 standard, the speed of the data transfer is 480 Mbps (Megabyte per second). However, the speed of the data transfer is over Gbps (Gigabyte per second) and is more than 4 Gbps in the USB 3.0 standard. Because the speed of the data transfer is so fast, it is necessary to provide an effective method for the virtual memory access to reduce loading of the computer system.

Therefore, there is a need to design a better memory access management scheme to effectively control memory access so as to reduce loading of the computer system and power consumption.

SUMMARY OF THE INVENTION

A memory management system is disclosed in the present invention to include a cache buffer, a memory mapping table, a data backup cache, and a memory controller. The cache buffer is configured to store a plurality of data structures. The memory mapping table is configured to store a plurality of addresses corresponding to the data structures, and the data backup cache is configured to store the base addresses of the data structure. The memory controller is configured to control the data structures reading and writing in the cache buffer and the data backup cache.

A memory management method is disclosed in the present invention to include a step of receiving an instruction in a memory controller and a step of comparing a plurality of addresses of data structures in a memory mapping table with the instruction by the memory controller. The method further includes a step of reading the data structure in a cache buffer when an address corresponding to the instruction is available in the memory mapping table, and a step of selecting a writable entry from the memory mapping table and reading the data structure in a system memory and writing the data structure to the cache buffer when the address corresponding to the instruction is not available in the memory mapping table.

BRIEF DESCRIPTION OF THE DRAWINGS

FIG. 4A, FIG. 4B, FIG. 4C, FIG. 4D and FIG. 4E are schematic diagrams illustrating the memory mapping table of the memory management system in the present invention.

DETAILED DESCRIPTION OF THE INVENTION

A detailed description of the present invention will now be provided with reference to the following embodiments, which are not intended to limit the scope of the present invention and which can be adapted for other applications. While the drawings are illustrated in detail, it is appreciated that the quantity of the disclosed components may be greater or less than that disclosed, except for instances expressly restricting the amount of the components.

Figure 1:
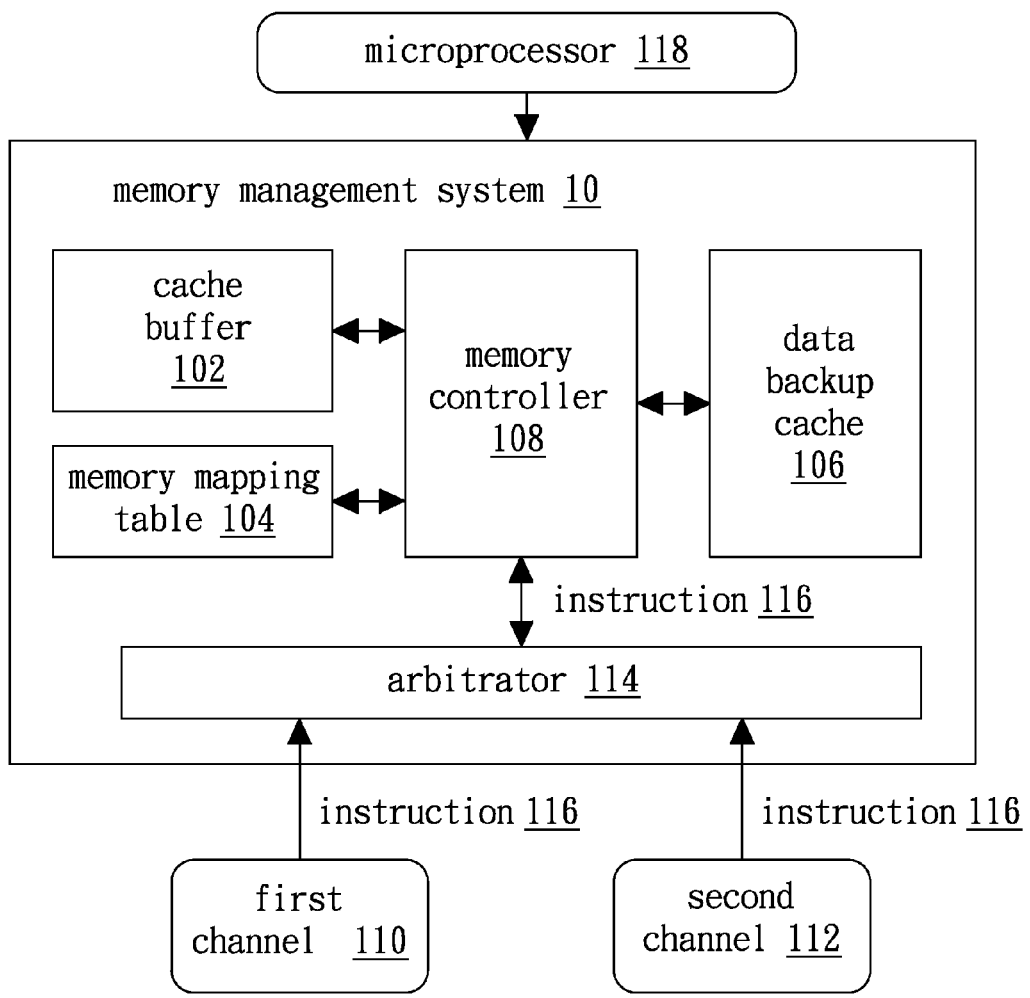
FIG. 1 is a schematic block diagram illustrating a memory management system of a preferred embodiment of the present invention.

FIG. 1 is a schematic block diagram showing a memory management system in a preferred embodiment of the present invention. According to the illustrated embodiment, the memory management system 10 comprises components including a cache buffer (such as a pipe table look-aside buffer, pipe TLB) 102, a memory mapping table (such as pipe mapping table) 104, a data backup cache (such as Scratchpad Buffer Address Cache) 106, and a memory controller 108. The cache buffer 102 is configured to store data structures (such as endpoint data structures) with 8 double words. In one embodiment, there are 32 endpoint data structures stored in the cache buffer 102 with those endpoint data structures being full association data structures. The memory mapping table 104 is configured to store the data addresses and other control information of the system memory corresponding to the endpoint data structures in the cache buffer 102. In one embodiment, there are 32 entries corresponding to the endpoint data structures of the cache buffer 102. The data backup cache 106 is configured to store a plurality of base addresses of all endpoint data structures such as the scratchpad buffer array base addresses and the scratchpad buffer entry base addresses. The memory controller 108 is configured to manage the reading and the writing of the endpoint data structures in the cache buffer 102 and the data backup cache 106 and search the correct endpoint data structures in an effective way according to the external signal request of the memory management system 10.

Still referring to FIG. 1, the memory management system 10 further includes a first channel 110, a second channel 112, and an arbitrator 114. The first channel 110 and the second channel 112 are configured to transfer an instruction 116 which includes address information of an endpoint data structure. In one embodiment, the first channel 110 is a super speed channel, and the second channel 112 is a high speed channel. The first channel 110 and the second channel 112 are selected in accordance with the data transfer speed of the instruction 116. The arbitrator 114 is configured to determine which instructions 116 (the instruction 116 in the first channel 110 or the instruction 116 in the second channel 112) to execute first in accordance with the priority of the instruction 116. When the instruction 116 is transmitted to the memory controller 108, the memory controller 108 will compare the addresses of the endpoint data structures in the memory mapping table 104 with the instruction 116 to search out (e.g., locate) an address corresponding to the instruction 116. If the address corresponding to the instruction 116 is available in the memory mapping table 104, the endpoint data structure corresponding to the instruction 116 has been stored in the cache buffer 102 and the endpoint data structure is sent back to the memory controller 108 for further executing. If the address corresponding to the instruction 116 is not available in the memory mapping table 104, the memory controller 108 will select an empty entry or a replaceable entry in the memory mapping table 104. In accordance with the instruction 116 and the corresponding scratchpad buffer array base address and the corresponding scratchpad buffer entry base address stored in the data backup cache 106, the memory controller 108 will find the endpoint data structure in the system memory, the address and other control information of the endpoint data structure will be written in the empty entry or the replaceable entry in the memory mapping table 104, and the endpoint data structure will be stored in the cache buffer 102. In addition, when the data flow control described above is finished or some error(s) has occurred in the memory management system of the present invention, the endpoint data structure stored in the cache buffer 102 is also in need of being updated.

However, it should be noted that the data addresses shown in FIG. 1 are updated according to a Least Recently Used (LRU) algorithm to refresh the entry of the memory mapping table 104. There are four bits in the memory mapping table 104 configured as in-active counter (IACTCNT), and those bits are configured to memorize the access records of the entries. According to the access records of the entries in the memory mapping table 104, the LRU algorithm is able to determine which entries is/are replaceable. As the LRU algorithm is well-known in the prior art by those persons skilled in the art, a detailed description of the LRU algorithm is omitted herein. In addition, the memory management system 10 further includes a microprocessor 118, which is configured to update the addresses of the endpoint data structures stored in each of the entries of the memory mapping table 104 according to the different conditions for the memory operation.

Figure 2:
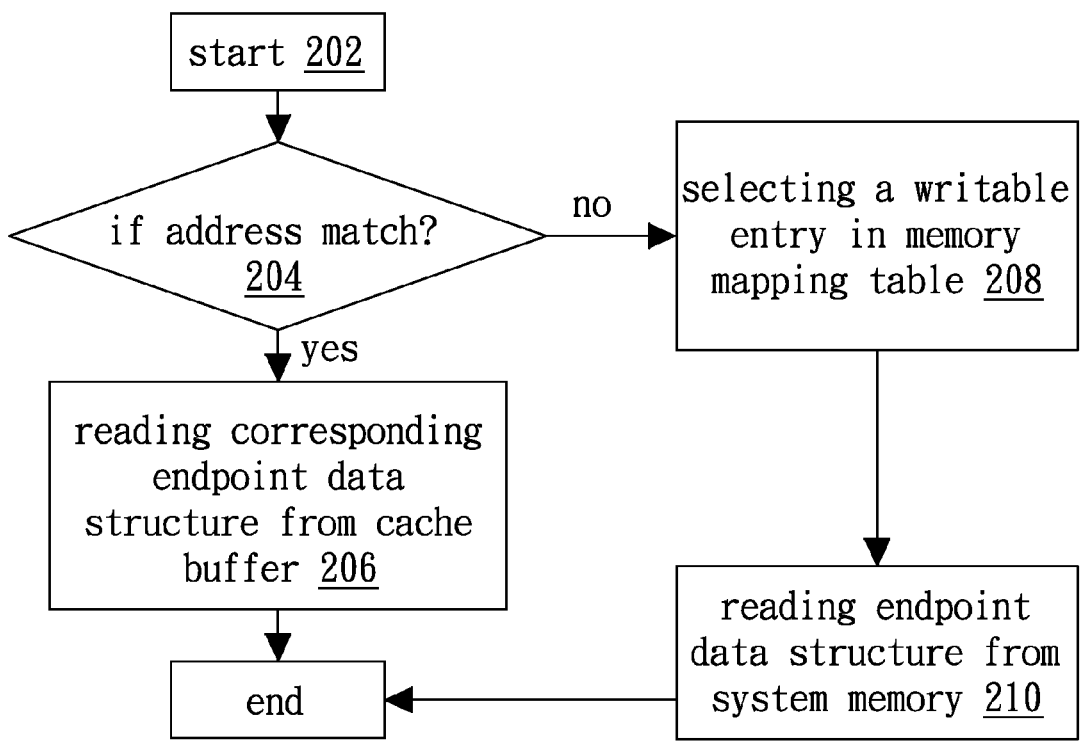
FIG. 2 is a flow chart illustrating memory reading and writing functions in the memory management system of the present invention.

FIG. 2 is a flow chart illustrating memory reading and writing functions in the memory management system of the present invention. As shown in the depicted process, a starting step 202 in which an initial status of the cache buffer 102 is idle is followed by step 204 in which an instruction 116 (PIPEREQ) is read in the memory controller 108 succeeded by the memory controller 108 comparing the addresses of the endpoint data structures in the memory mapping table 104 with the instruction 116. At step 206, if the address corresponding to the instruction 116 is available in the memory mapping table 104, the endpoint data structure corresponding to the instruction 116 has been stored in the cache buffer 102 and the endpoint data structure is read from the cache buffer 102, and the memory reading steps are finished. At step 208, if the address corresponding to the instruction 116 is not available in the memory mapping table 104, an empty entry or a replaceable entry in the memory mapping table 104 is selected as a writable entry. At step 210, the endpoint data structure is read from the system memory in accordance with the instruction 116 and the scratchpad buffer array base address and the scratchpad buffer entry base address stored in the data backup cache 106, and the address of the endpoint data structure is written in the writable entry of the memory mapping table 104 found at step 208. The endpoint data structure is written into the cache buffer 102.

Figure 3:
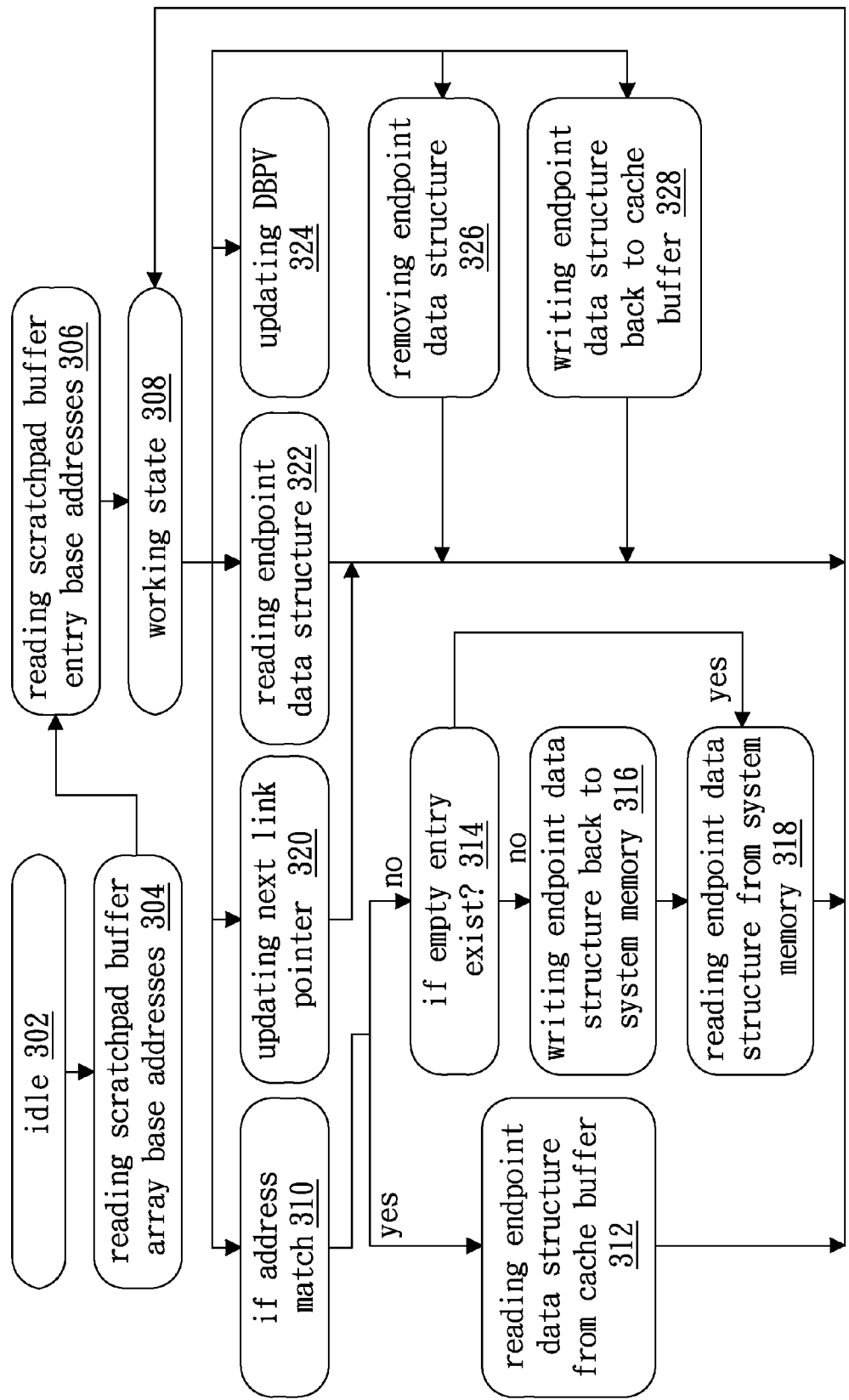
FIG. 3 is a state diagram illustrating states of the memory management method in the present invention.

FIG. 3 is a state diagram illustrating the states of the memory management method in the present invention. As indicated in the exemplary implementation, an idle state 302 is followed by states 304 and 306, in which the scratchpad buffer array base addresses and the scratchpad buffer entry base addresses of all the endpoint data structures are read from the system memory and stored in the data backup cache 106. Progression from the initial states 302, 304 and 306 leads to state 308, in which the cache buffer 102 in working state is made ready to read and write. In state 310, the addresses of the endpoint data structures in the memory mapping table 104 are compared with the instruction 116. In state 312, if the address corresponding to the instruction 116 is available in the memory mapping table 104, the 8 double words endpoint data structure has been stored in the cache buffer 102 and the 8 double words endpoint data structure is read from the cache buffer 102, and then the state is returned to state 308. In state 314, if the address corresponding to the instruction 116 is not available in the memory mapping table 104, an empty entry is sought and/or identified in the memory mapping table 104. If the empty entry exists in the memory mapping table 104, the empty entry is selected to be the writable entry followed by movement to state 318. If the empty entry does not exist in the memory mapping table 104, a replaceable entry in the memory mapping table 104 is selected to be the writable entry followed by movement to state 316. In state 316, the endpoint data structure in the cache buffer 102 corresponding to the writable entry in the memory mapping table 104 is written into the system memory, with the progression then going to state 318. In state 318, the endpoint data structure is read from the system memory and written in the cache buffer 102, and the address of the endpoint data structure is written into the writable entry in the memory mapping table 104, with the progression then returning to state 308. In state 320, the microprocessor 118 will request to (and/or will) update the next link pointer of the endpoint data structures. In state 322, the microprocessor 118 requests to (and/or will) read the 8 double words endpoint data structure. In state 324, according to an example in which "doorbell ring" is one of the addresses in the mapping table 104, when the address of doorbell ring is 1, the microprocessor 118 will request to (and/or will) update the address of DBPV (an address name or mark, in the example) in the memory mapping table 104. In state 326, the microprocessor 118 will request to (and/or will) remove an 8 double words endpoint data structure in the cache buffer 102 when the endpoint data structure should be removed from the asynchronous or periodic time table. When the instruction 116 has been executed or an error exists or occurs during executing the instruction 116, the endpoint data structure in the cache buffer 102 will be updated. In state 328, the microprocessor 118 will request to (and/or will) write the updated endpoint data structure in the cache buffer 102 back to the system memory.

FIG. 4A, FIG. 4B, FIG. 4C, FIG. 4D and FIG. 4E are schematic diagrams illustrating an implementation of the memory mapping table of the memory management system according to an embodiment of the present invention. As shown in FIG. 4A, the data in addresses 0~12 is the address of the endpoint data structure in the system memory. The data in addresses 13~16 is configured for the microprocessor to control or confirm whether the entry in the memory mapping table is ready, whether the entry is available, and whether the entry is locked. The data in addresses 17~20 is the In-Active Counter and configured to record the LRU algorithm. The addresses 21~31 are the reserved addresses. FIG. 4B is a schematic diagram illustrating the address arrangement in the memory mapping table when the next link pointer of the endpoint data structure needs to be updated when the endpoint data structure is in asynchronous status, and FIG. 4C is a schematic diagram illustrating the address arrangement in the memory mapping table when the address in the DBPV needs to be updated. The schematic diagram of FIG. 4D illustrates the address arrangement in the memory mapping table when the endpoint data structures in the memory endpoint data structure need to be removed. FIG. 4E is a schematic diagram illustrating the address arrangement in the memory mapping when the endpoint data structure in the cache buffer needs to be read.

Although specific embodiments have been illustrated and described, it will be appreciated by those skilled in the art that various modifications may be made without departing from the scope of the present invention, which is intended to be limited solely by the appended claims.

What is claimed is:

1. A memory management system, comprising:
a cache buffer configured to store a plurality of data structures;
a memory mapping table configured to store a plurality of addresses corresponding to said data structures;
a data backup cache configured to store a plurality of base addresses of all data structures in the system memory, wherein all the base addresses of all the data structures are read from said system memory and stored in said data backup cache when said system is in an idle state; and
a memory controller configured to control said data structures being read and written in said cache buffer and said data backup cache, whereby when an address corresponding to an instruction is not available in said memory mapping table, said memory controller is configured to read a specific data structure according to said instruction and a corresponding base address stored in the data backup cache from the system memory and to store said specific data structure corresponding to said instruction in said cache buffer.

2. The memory management system of claim 1, further comprising a first channel, a second channel, and an arbitrator, wherein said first channel or said second channel is selected to transmit said instruction in accordance with transmitting speed and said arbitrator determines priority order of said instructions, with the higher priority instruction being transmitted first to said memory controller.

3. The memory management system of claim 1, wherein said memory controller is configured to compare the addresses corresponding to said data structures in the memory mapping table with the instruction.

4. The memory management system of claim 3, wherein said memory controller is configured to read said specific data structure from said cache buffer when the address corresponding to the instruction is available in the memory mapping table.

5. The memory management system of claim 1, wherein said system is configured to select an empty entry to be a writable entry when the address corresponding to the instruction is not available in the memory mapping table and said empty entry exists in said memory mapping table, and said address which is not found in said memory mapping table is written in said writable entry, and when said empty entry does not exist, said system is configured to select a replaceable entry to be said writable entry, and a data structure corresponding to said address in said replaceable entry is written back to said system memory and said address which is not found in said memory mapping table is written in said writable entry.

6. The memory management system of claim 1, further comprising a microprocessor, wherein said microprocessor is configured to update a plurality of said addresses in said memory mapping table.

7. The memory management system of claim 1, wherein said cache buffer is a Pipe Table Look-aside Buffer (TLB).

8. The memory management system of claim 1, wherein said data backup cache is a Scratchpad Buffer Address Cache.

9. A memory management method, comprising:
reading all base addresses of all data structures in a system memory and storing said all base addresses in a data backup cache when a system is in an idle state;
receiving an instruction in a memory controller;
comparing a plurality of addresses of a plurality of data structures in a memory mapping table with said instruction by said memory controller;
reading a specific data structure corresponding to said instruction from a cache buffer when an address corresponding to the instruction is available in the memory mapping table; and
selecting a writable entry from the memory mapping table and reading said specific data structure from said system memory according to said instruction and a corresponding base address stored in the data backup cache and writing said specific data structure to said cache buffer when the address corresponding to said instruction is not available in the memory mapping table.

10. The memory management method of claim 9, wherein an empty entry is selected to be said writable entry when said address corresponding to the instruction is not available in the memory mapping table and said empty entry exists in said memory mapping table, and said address is written in said writable entry, and when said address corresponding to the instruction is not available in the memory mapping table and said empty entry does not exist, a replaceable entry is selected to be said writable entry and a data structure corresponding to said address in said replaceable entry is written back to said system memory and said address is written in said writable entry.

11. The memory management method of claim 9, wherein said instruction is transmitted from a first channel or a second channel to said memory controller and a priority order of said instruction is determined by an arbitrator, wherein said instruction with higher priority order is transmitted first to said memory controller.

12. The memory management method of claim 9, further comprising a microprocessor which operates to update a plurality of said addresses in said memory mapping table.

13. The memory management method of claim 9, wherein said reading comprises reading a data structure from a cache buffer that is a Pipe Table Look-aside Buffer (TLB).

14. The memory management method of claim 9, wherein the plurality of base addresses of said data structure are stored in a Scratchpad.

15. The memory management method of claim 9, wherein said data structure used is an 8 double words endpoint data structure.

16. The memory management method of claim 9, wherein said memory management method utilizes a Least Recently Used (LRU) algorithm to select which entry is said writable entry.

17. The memory management method of claim 9, wherein said data structures used in said memory management method are full association endpoint data structures.

* * * * *